US012739064B2

(12) United States Patent
Han et al.

(10) Patent No.: US 12,739,064 B2
(45) Date of Patent: Sep. 15, 2026

(54) METHOD AND APPARATUS FOR SIDELINK RESOURCE ALLOCATION

(71) Applicant: LENOVO (BEIJING) LIMITED, Beijing (CN)

(72) Inventors: Jing Han, Beijing (CN); Joachim Lohr, Wiesbaden (DE); Prateek Basu Mallick, Dreieich (DE); Xiaodong Yu, Beijing (CN); Lianhai Wu, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 497 days.

(21) Appl. No.: 17/603,975

(22) PCT Filed: Apr. 30, 2019

(86) PCT No.: PCT/CN2019/085264
§ 371 (c)(1),
(2) Date: Oct. 15, 2021

(87) PCT Pub. No.: WO2020/220291
PCT Pub. Date: Nov. 5, 2020

(65) Prior Publication Data

US 2022/0209905 A1 Jun. 30, 2022

(51) Int. Cl.
*H04L 1/1867* (2023.01)
*H04L 1/1829* (2023.01)

(52) U.S. Cl.
CPC .......... *H04L 1/1887* (2013.01); *H04L 1/1861* (2013.01)

(58) Field of Classification Search
CPC ............................ H04L 1/1887; H04L 1/1861
See application file for complete search history.

(56) References Cited

U.S. PATENT DOCUMENTS

2020/0029318 A1* 1/2020 Guo ...................... H04W 72/23
2020/0068593 A1* 2/2020 Seo .................. H04W 72/1263
(Continued)

FOREIGN PATENT DOCUMENTS

WO 2018006313 A1 1/2018
WO 2018029023 A1 2/2018
(Continued)

OTHER PUBLICATIONS

International Searching Authority, "Written Opinion of the International Searching Authority," PCT/CN2019/085264, Jan. 20, 2020, pp. 1-3.

*Primary Examiner* — Sithu Ko
*Assistant Examiner* — Malick A Sohrab
(74) *Attorney, Agent, or Firm* — Kunzler Needham & Hilton

(57) ABSTRACT

Embodiments of the present application are directed to a method and apparatus for sidelink resource allocation. In an embodiment of the present application, the method includes determining a plurality of initial transmission resources, wherein each of the plurality of initial transmission resources is associated with a packet to be transmitted on a sidelink channel between a transmitting user equipment (UE) and a receiving UE; determining whether one or more retransmission resources are to be reserved for at least one of the packets associated with the plurality of initial transmission resources; and reserving the one or more retransmission resources for at least one of the packets in response to that the one or more retransmission resources are determined to be reserved.

20 Claims, 5 Drawing Sheets

(56) References Cited

U.S. PATENT DOCUMENTS

| | | | | |
|---|---|---|---|---|
| 2020/0145799 | A1* | 5/2020 | Baghel | H04W 4/46 |
| 2020/0169986 | A1* | 5/2020 | Lee | H04W 72/542 |
| 2020/0235848 | A1* | 7/2020 | Nguyen | H04L 1/0038 |
| 2021/0160821 | A1* | 5/2021 | Lin | H04W 72/02 |
| 2021/0168814 | A1* | 6/2021 | Chen | H04W 72/02 |
| 2022/0007338 | A1* | 1/2022 | Zhao | H04L 1/1887 |
| 2022/0060929 | A1* | 2/2022 | Hassan | H04W 28/0284 |
| 2022/0167312 | A1* | 5/2022 | Lee | H04L 5/0055 |
| 2022/0174695 | A1* | 6/2022 | Lee | H04L 1/1896 |

FOREIGN PATENT DOCUMENTS

| | | | |
|---|---|---|---|
| WO | 2018030825 | A1 | 2/2018 |
| WO | 2018124776 | A1 | 7/2018 |

* cited by examiner

METHOD AND APPARATUS FOR SIDELINK RESOURCE ALLOCATION

TECHNICAL FIELD

Embodiments of the present application generally relate to wireless communication technology, especially to a method and apparatus for sidelink resource allocation.

BACKGROUND

In a wireless communication system, a user equipment (UE) (e.g., mobile device) may communicate with another UE via a data path of an operator network. The data path of the operator network may include a base station (BS) and gateways.

In the case that an UE and another UE are relatively close to each other, a radio link or a sidelink can be established without going through a direct link to the BS to provide Device-to-Device (D2D) communication. The term "side-link" refers to a direct radio link for communication among devices, as opposed to communication via the cellular infrastructure (uplink and downlink) as discussed above. The "sidelink" is also referred to as a D2D link. D2D communication may be used in any suitable telecommunication network in accordance with various standards. The network may configure a resource pool that may perform the D2D operation to the UE.

D2D operation may provide various advantages, for example, a relatively high transfer rate, a relatively low delay, etc. Moreover, in D2D operation, traffic concentrated on a base station can be distributed. Furthermore, D2D UE may function as a relay to extend coverage of a base station.

D2D communication evolves into vehicle-to-anything (V2X) communication in the Long Term Evolution (LTE) sidelink. V2X communications encompass communications involving vehicles as message sources or destinations. In a New Radio (NR) communication system, unicast and groupcast are introduced into V2X communications, so as to further improve the transmission efficiency on the sidelink between e.g., car to car transmissions and fulfill more stringent advanced V2X service QoS requirements.

Unicast means that data on a sidelink is only sent to a specific V2X UE and cannot be decoded by other UEs in AS (Access Stratum) layer. Groupcast means that data on a sidelink is sent to a group of V2X UEs, and cannot be decoded by other UEs in AS layer. Unicast/groupcast transmission in AS layer is new compared with the LTE V2X transmission scheme, in which only broadcast transmission is supported in the AS layer.

In addition, only blind retransmission is supported in LTE V2X transmission scheme, which means the retransmissions are always performed, and resources for retransmissions are always been reserved.

In order to save transmission power and reduce interference on a sidelink, a UE does not need to always perform retransmissions as that in the LTE V2X transmission scheme. Accordingly, a retransmission mechanism in the NR V2X transmission scheme needs to be re-considered.

SUMMARY OF THE APPLICATION

An embodiment of the present application provides a method. The method may include determining a plurality of initial transmission resources, wherein each of the plurality of initial transmission resources is associated with a packet to be transmitted on a sidelink channel between a transmitting UE and a receiving UE; determining whether one or more retransmission resources are to be reserved for at least one of the packets associated with the plurality of initial transmission resources; and reserving the one or more retransmission resources for at least one of the packets in response to that the one or more retransmission resources are determined to be reserved.

In an embodiment of the present application, determining whether one or more retransmission resources are to be reserved is based on hybrid automatic repeat request (HARQ) feedback from the receiving UE.

In an embodiment of the present application, in response to that the HARQ feedback from the receiving UE is a HARQ ACK, no or a minimum retransmission resource is to be reserved for the at least one of the packets.

In an embodiment of the present application, in response to that the HARQ feedback from the receiving UE is a HARQ NACK associated with a first one of the packets, or a plurality of HARQ NACKs including the HARQ NACK associated with the first one of the packets in a time period, one or more retransmission resources are determined to be reserved for the first one of the packets.

In an embodiment of the present application, in response to that the HARQ feedback from the receiving UE is a HARQ NACK associated with a first one of the packets, or a plurality of HARQ NACKs including the HARQ NACK associated with the first one of the packets in a time period, one or more retransmission resources are determined to be reserved for a second one of the packets, wherein the second one of the packets is subsequent to the first one of the packets.

In an embodiment of the present application, in response to that the HARQ feedback from the receiving UE is a HARQ NACK associated with a first one of the packets, or a plurality of HARQ NACKs including the HARQ NACK associated with the first one of the packets in a first time period, one or more retransmission resources are determined to be reserved for each packet to be transmitted in a second time period after receiving the HARQ feedback.

In an embodiment of the present application, the method may further include releasing the reserved one or more retransmission resources in response to one or more HARQ ACKs received from the receiving UE.

In an embodiment of the present application, determining whether one or more retransmission resources are to be reserved is based on the channel status between the transmitting UE and the receiving UE.

In an embodiment of the present application, the channel status between the transmitting UE and the receiving UE is defined as a plurality of levels based on at least one threshold, no or a minimum retransmission resource is reserved for the at least one packet in response to the channel status with the highest level, and a maximum of retransmission resources is reserved for the at least one packet in response to the channel status with the lowest level.

In an embodiment of the present application, determining whether one or more retransmission resources are to be reserved is based on distance or maximum coupling loss (MCL) between the transmitting UE and the receiving UE.

In an embodiment of the present application, the distance or MCL between the transmitting UE and the receiving UE is defined as a plurality of levels based on at least one threshold, no or a minimum retransmission resource is reserved for the at least one packet in response to the distance or MCL with the highest level, and a maximum of retransmission resources is reserved for the at least one packet in response to the distance or MCL with the lowest level.

In an embodiment of the present application, determining whether one or more retransmission resources are to be reserved is based on the Channel Busy Ratio (CBR) of a transmission resource pool.

In an embodiment of the present application, the CBR is defined as a plurality of levels based on at least one threshold, no or a minimum retransmission resource is reserved for the at least one packet in response to the CBR with the highest level, and a maximum of retransmission resources is reserved for the at least one packet in response to the CBR with the lowest level.

In an embodiment of the present application, determining whether one or more retransmission resources are to be reserved is based on a mapping between levels of the Channel Busy Ratio (CBR) of a transmission resource pool and levels of the service requirement of the transmitting UE.

In an embodiment of the present application, the mapping between the levels of the CBR and the levels of the service requirement is configured by a base station or is preconfigured.

In an embodiment of the present application, reserving the one or more retransmission resources comprising one of the following: selecting the one or more retransmission resources by sensing available resources in a transmission resource pool; randomly selecting the one or more retransmission resources in a transmission resource pool; and requesting a base station to reserve the one or more retransmission resources.

Another embodiment of the present application provides a method. The apparatus may include determining a retransmission resource reserved for a packet transmitted between a transmitting UE and a receiving UE being reusable in response to that the packet is determined not to be retransmitted; and using the retransmission resource in another transmission instead of retransmitting the packet.

In an embodiment of the present application, the receiving UE uses the retransmission resource before the retransmission resource is reserved by sending an indication to the transmitting UE.

In an embodiment of the present application, the method may include transmitting a hybrid automatic repeat request (HARQ) ACK to the transmitting UE; and releasing the retransmission resource by sending an indication that the retransmission resource is released.

In an embodiment of the present application, the method may include receiving a hybrid automatic repeat request (HARQ) ACK feedback from the receiving UE; and releasing the retransmission resource by sending an indication that the retransmission resource is released.

Another embodiment of the present application provides an apparatus. The apparatus may include at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement the above method with the at least one receiver, the at least one transmitter and the at least one processor.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application, and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings.

Figure 1:
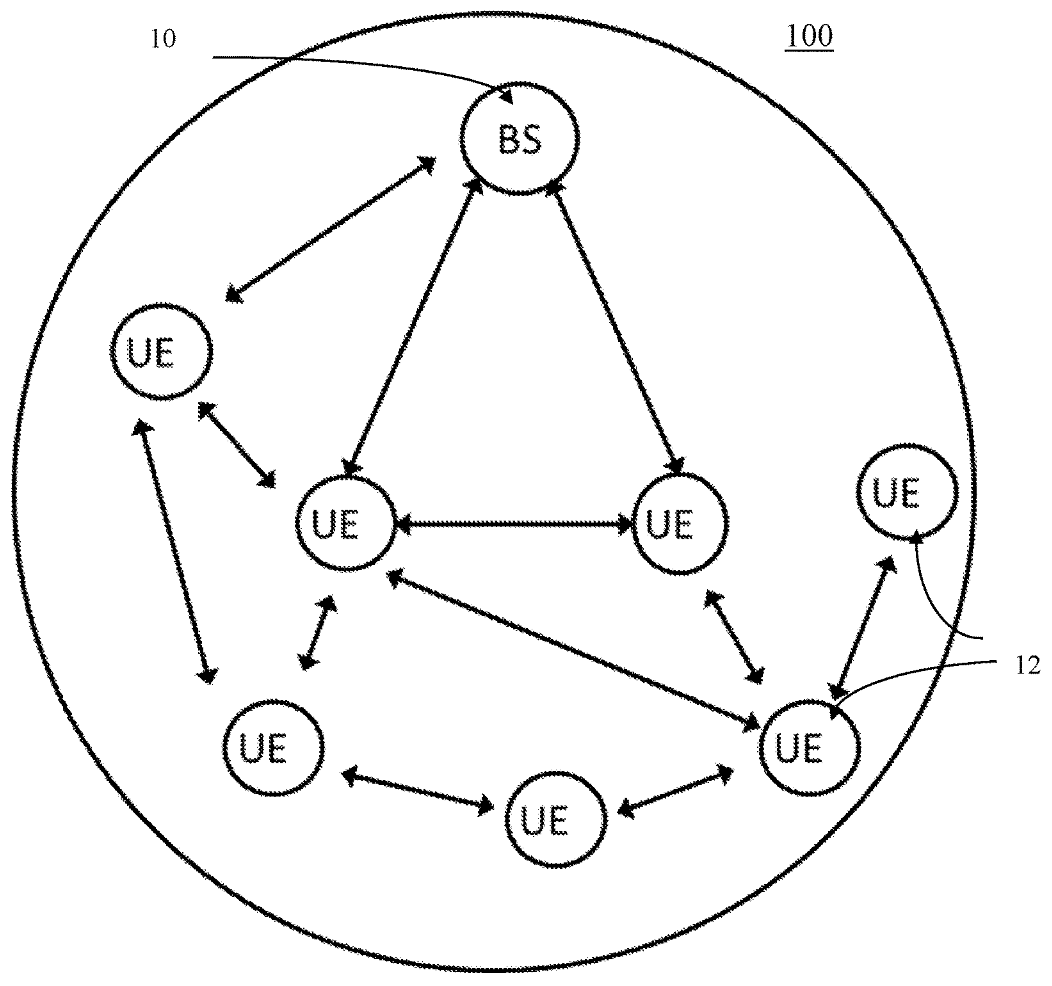
FIG. 1 illustrates an exemplary scenario of a wireless communication system in accordance with some embodiments of the present application.

FIG. 1 illustrates an exemplary scenario of a wireless communication system 100 in accordance with some embodiments of the present application.

Referring to FIG. 1, the wireless communication system 100 includes a base station (BS) 10, and a set of UEs 12, which is within the coverage of the BS 10 in this scenario. All or part of the set of UEs 12 may move out of the coverage of the BS 10 in other scenario. Although merely one base station 10 is illustrated in FIG. 1 for simplicity, it is contemplated that the wireless communication system 100 may include more base stations 10 in some other embodiments of the present application. Although merely seven UEs 12 are illustrated in FIG. 1 for simplicity, it is contemplated that the wireless communication system 100 may include more or less UE(s) 12 in some embodiments of the present application.

ABS 10 may operate, for example but is not limited to, based on the standard protocol of Long-Term Evolution (LTE), LTE-Advanced (LTE-A), New Radio (NR), or other suitable protocol(s). The BS 10 may schedule resource for each UE 12 to perform transmission of data and information control during direct D2D or sidelink communication.

A UE 12 may include, for example but is not limited to, a computing device, a wearable device, a mobile device, an Internet of Things (IoT) device, a vehicle having at least a transceiver, etc. Different UEs 12 may have the same or similar structures. Persons skilled in the art should understand that as the technology develops and advances, the terminologies described in the present application may change, and should not affect or limit principle and spirit in the present application. Each UE 12 itself may select a resource from a resource pool for D2D or sidelink communication during direct data transfer and direct information control.

Figure 2:
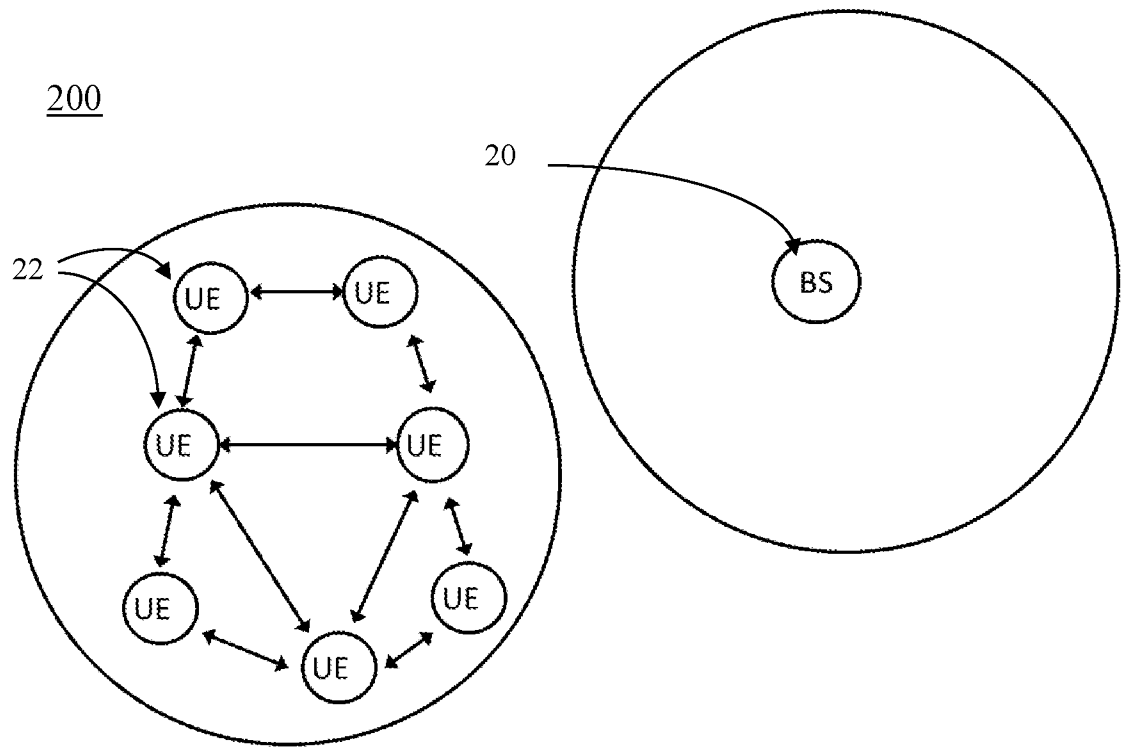
FIG. 2 illustrates another exemplary scenario of a wireless communication system in accordance with some embodiments of the present application.

FIG. 2 illustrates another exemplary scenario of a wireless communication system 200 in accordance with some embodiments of the present application. Although the scenarios shown in FIG. 1 and FIG. 2 are different, the wireless communication system 100 shown in FIG. 1 may be the same as or different to the wireless communication system 200 shown in FIG. 2.

Referring to FIG. 2, the wireless communication system 200 includes a BS 20, and a set of UEs 22, which is out of the coverage of the BS 20 in this scenario. All or part of the set of UEs 12 may move into the coverage of the BS 10 in other scenario. Although merely one base station 20 is illustrated in FIG. 2 for simplicity, it is contemplated that the wireless communication system 200 may include more base stations 20 in some other embodiments of the present application. Although merely seven UEs are illustrated in FIG. 2 for simplicity, it is contemplated that the wireless communication system 200 may include more or less UEs in some other embodiments of the present application.

A UE 22 may include, for example but is not limited to, a computing device, a wearable device, a mobile device, an IoT device, a vehicle having at least a transceiver, etc. Different UEs 22 may have the same or similar structures. Persons skilled in the art should understand that as the technology develops and advances, the terminologies described in the present application may change, and should not affect or limit principle and spirit in the present application. Since the set of UEs 22 is out of coverage of the BS 20, the BS 20 cannot schedule resource for each UE 22 to perform sidelink communication. Accordingly, each UE 22 out of the coverage of the BS 20 itself may select a resource from a resource pool for D2D or sidelink communication.

In a NR V2X communication system, HARQ feedback is introduced. Retransmissions based on HARQ feedback can be performed to replace blind retransmissions.

For example, for unicast and groupcast with HARQ feedback, resources for initial transmission and retransmission are reserved before the initial transmission, and whether each reserved retransmission resource will be used depends on the HARQ feedback from a receiving UE. That is, the resource for retransmission is always reserved. In the case of receiving a HARQ ACK, which means the initial transmission is successfully, a retransmission will not happen and the resources reserved for the retransmission are wasted. The resource waste issue is even more severe when there are multiple retransmission times being configured, e.g., the retransmission times is configured as 4, and 4 multiple of the retransmission resources for each initial transmission need to be reserved. In this case, the maximum wasted resource is quadrupled compared with the case that one-time retransmission resource is always reserved.

In another example, when selecting a resource for the initial transmission, the UE can only reserve the resource for one retransmission. In response to receiving a HARQ NACK, resources for a further retransmission can be reserved. Accordingly, in response to receiving a HARQ ACK, only the resource reserved for one retransmission will be wasted. But still, the first retransmission resource is wasted at most time, e.g., normally the block error ratio (BLER) target for initial transmission is 10%, which means that in 90% cases the initial transmission can be correctly decoded, and in 90% cases the first retransmission resource is wasted.

Embodiments of the present application propose technical solutions for conditionally reserving retransmission resources and technical solutions for reusing the reserved retransmission resources. Both of them can increase the resource utilization efficiency and avoid resource waste.

Figure 3:
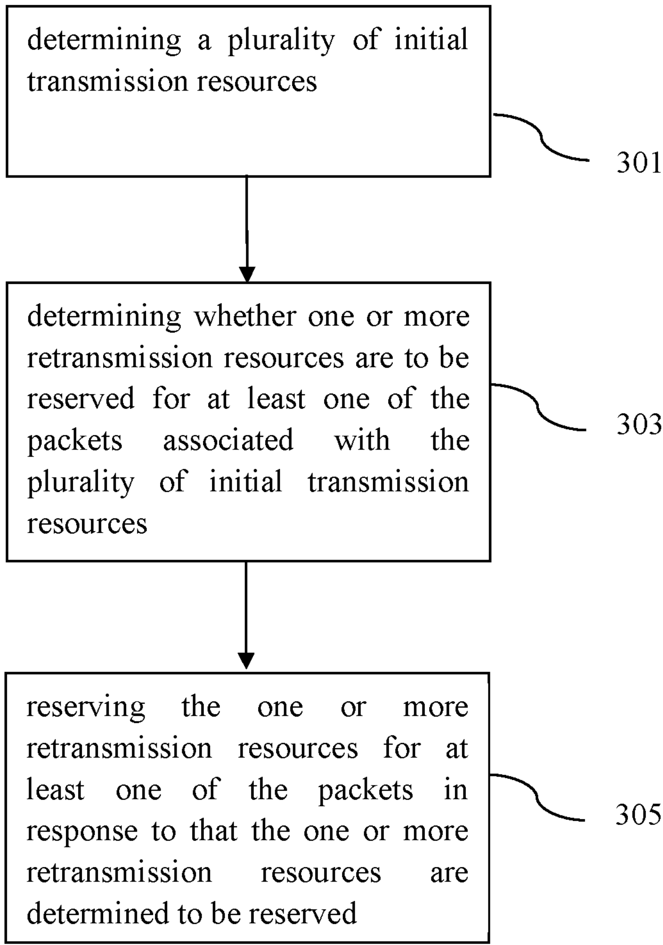
FIG. 3 is a flow diagram illustrating a method for sidelink resource allocation in accordance with some embodiments of the present application.

FIG. 3 is a flow diagram illustrating a method for sidelink resource allocation in accordance with some embodiments of the present application. The method may be implemented by a transmitting UE, for example, any UE in the wireless communication system 100 shown in FIG. 1 and the wireless communication system 200 shown in FIG. 2.

As shown in step 301, a plurality of initial transmission resources can be determined. Each of the plurality of initial transmission resources is associated with a packet to be transmitted on a sidelink channel between the transmitting UE and a receiving UE with respect to the transmitting UE. Similarly, the receiving UE can be any UE in the wireless communication system 100 shown in FIG. 1 and the wireless communication system 200 shown in FIG. 2.

For example, in the wireless communication system 100 as shown in FIG. 1, a BS (for example, gNB, or eNB), such as the BS 10 in FIG. 1 may configure a plurality of available transmission resources, each of which is used for initial transmission of each packet, and indicate them to the transmitting UE via radio resource control (RRC) signaling and downlink control information (DCI) signaling to the transmitting UE. In some embodiments of the present application, the BS may indicate the configured transmission resources only via RRC signaling. Then, the transmitting UE can determine a plurality of transmission resources for initial transmission of packets to be transmitted in a sidelink based on the configured transmission resources.

In another example, in the wireless communication system 200 as shown in FIG. 2, a transmitting UE may determine the initial transmission resources by sensing a transmission resource pool to select a plurality of initial transmission resources for the packets to be transmitted on a sidelink.

According to some embodiments of the present application, retransmission resources can be conditionally reserved instead of always being reserved. Accordingly, in step 303, whether one or more retransmission resources are to be reserved for at least one of the packets associated with the plurality of initial transmission resources may be determined based on HARQ feedback, channel status between a transmitting UE and a receiving UE, distance/maximum coupling loss (MCL) between a transmitting UE and a receiving UE, or channel busy ratio (CBR) of a transmission resource pool etc.

For example, in some embodiments of the present application, the transmitting UE may determine whether one or more retransmission resources are to be reserved based on the HARQ feedback from the receiving UE.

In some embodiments of the present application, in response to that the HARQ feedback from the receiving UE is a HARQ ACK, no or a minimum retransmission resource is to be reserved for the at least one of the packets. For example, in the case that the transmitting UE receives a HARQ ACK, it may determine no retransmission resource is to be reserved. In the case that a minimum retransmission resource, e.g., one retransmission resource is required according to configuration or pre-configuration information, it may determine a minimum retransmission resource to be reserved.

In some embodiments of the present application, in response to that the HARQ feedback from the receiving UE is a HARQ NACK associated with a first one of the packets, or a plurality of HARQ NACKs including the HARQ NACK associated with the first one of the packets in a time period, one or more retransmission resources are determined to be reserved for the first one of the packets.

For example, in the case that the transmitting UE receives a HARQ NACK associated with a first packet, it may determine one retransmission resource to be reserved for the first packet, or it may determine N retransmission resources to be reserved for the first packet, N>1. N can be the maximum retransmission times, which can be configured by gNB/eNB (such as BS 10 in FIG. 1) or preconfigured in the transmitting UE (such as UE 22 in FIG. 2). In another embodiment of the present application, N may be a number less than the maximum retransmission times. For example, in the case that the number of maximum retransmission times is 4, N may be 2 or 3.

In another example, in the case that the transmitting UE receives a plurality of HARQ NACKs associated with the first packet in a time period, it may determine one retransmission resource to be reserved for the first packet, or it may determine N retransmission resources to be reserved for the first packet, N>1. N can be the maximum retransmission times, which can be configured by gNB/eNB (such as BS 10 in FIG. 1) or preconfigured in the transmitting UE (such as UE 22 in FIG. 2). In another embodiment of the present application, N may be a number less than the maximum retransmission times. For example, in the case that the number of maximum retransmission times is 4, N may be 2 or 3.

In some embodiments of the present application, in response to that the HARQ feedback from the receiving UE is a HARQ NACK associated with a first one of the packets, or a plurality of HARQ NACKs including the HARQ NACK associated with the first one of the packets in a time period, one or more retransmission resources are determined to be reserved for a second one of the packets, wherein the second one of the packets is subsequent to the first one of the packets.

For example, in the case that the transmitting UE receives a HARQ NACK associated with the first packet, it may determine one retransmission resource to be reserved for the second packet, or it may determine N retransmission resources to be reserved for the second packet, N>1. N can be the maximum retransmission times, which can be configured by gNB/eNB (such as BS 10 in FIG. 1) or preconfigured in the transmitting UE (such as UE 22 in FIG. 2). In another embodiment of the present application, N may be a number less than the maximum retransmission times. For example, in the case that the number of maximum retransmission times is 4, N may be 2 or 3.

In another example, in the case that the transmitting UE receives a plurality of HARQ NACKs associated with the first packet in a time period, it may determine one retransmission resource to be reserved for the second packet, or it may determine N retransmission resources to be reserved for the second packet, N>1. N can be the maximum retransmission times, which can be configured by gNB/eNB (such as BS 10 in FIG. 1) or preconfigured in the transmitting UE (such as UE 22 in FIG. 2). In another embodiment of the present application, N may be a number less than the maximum retransmission times. For example, in the case that the number of maximum retransmission times is 4, N may be 2 or 3.

In some embodiments of the present application, in response to that the HARQ feedback from the receiving UE is a HARQ NACK associated with a first one of the packets, or a plurality of HARQ NACKs including the HARQ NACK associated with the first one of the packets in a first time period, one or more retransmission resources are determined to be reserved for each packet to be transmitted in a second time period after receiving the HARQ feedback.

For example, in the case that the transmitting UE receives a HARQ NACK associated with the first packet, it may determine one retransmission resource to be reserved for each packet to be transmitted for the following time period T2, or it may determine N retransmission resources to be reserved for each packet to be transmitted for the following time period T2, where T2 can be configured by gNB/eNB (such as BS 10 in FIG. 1) or preconfigured in the transmitting UE (such as UE 22 in FIG. 2), N>1. N can be the maximum retransmission times, which can be configured by gNB/eNB (such as BS 10 in FIG. 1) or preconfigured in the transmitting UE (such as UE 22 in FIG. 2). In another embodiment of the present application, N may be a number less than the maximum retransmission times. For example, in the case that the number of maximum retransmission times is 4, N may be 2 or 3.

In another example, in the case that the transmitting UE receives a plurality of HARQ NACKs associated with the first packet in a time period T1, it may determine one retransmission resource to be reserved for each packet to be transmitted for the following time period T2, or it may determine N retransmission resources to be reserved for each packet to be transmitted for the following time period T2, where T1 and T2 can be configured by gNB/eNB (such as BS 10 in FIG. 1) or preconfigured in the transmitting UE (such as UE 22 in FIG. 2), N>1. N can be the maximum retransmission times, which can be configured by gNB/eNB (such as BS 10 in FIG. 1) or preconfigured in the transmitting UE (such as UE 22 in FIG. 2). In another embodiment of the present application, N may be a number less than the maximum retransmission times. For example, in the case that the number of maximum retransmission times is 4, N may be 2 or 3.

For another example, in an embodiment of the present application, the transmitting UE may determine whether one or more retransmission resources are to be reserved based on the channel status between the transmitting UE and the receiving UE, which can be obtained from the receiving UE through a channel state information (CSI) report. The better the channel status is, the less the retransmission resources are to be reserved. The mapping relationship between the channel status and the number of the retransmission resources can be configured by gNB/eNB (such as BS 10 in FIG. 1) or preconfigured in the transmitting UE (such as UE 22 in FIG. 2).

In some embodiments of the present application, the channel status between the transmitting UE and the receiving UE is defined as a plurality of levels based on at least one threshold. The threshold can be configured by gNB/eNB (such as BS 10 in FIG. 1) or preconfigured in a transmitting UE (such as UE 22 in FIG. 2).

In an embodiment of the present application, the channel status is divided into two levels (i.e., a highest level and a lowest level). No or a minimum retransmission resource is reserved for the at least one packet in response to the channel status with the highest level, and a maximum of retransmission resources is reserved for the at least one packet in response to the channel status with the lowest level. The minimum retransmission resource may be 1 or another number less than the maximum retransmission resources.

In another embodiment of the present application, the channel status can be divided into more than two levels, such as three levels (i.e., a highest level, a middle level and a lowest level). No retransmission resource is reserved in response to the channel status with the highest level, one retransmission resource is reserved in response to the channel status with the middle level, and two retransmission resources are reserved in response to the channel status with the lowest level. It should be understand that, the number of the retransmission resources, i.e., one and two are provided as examples, which can be changed according to the actual needs.

For yet another example, in some embodiment of the present application, the transmitting UE may determine whether one or more retransmission resources are to be reserved based on distance or maximum coupling loss (MCL) between the transmitting UE and the receiving UE. The distance or MCR between the transmitting UE and the receiving UE can be measured by the transmitted UE. The longer the distance or the higher MCL is, the more the retransmission resources are to be reserved. The mapping relationship between the distance or MCL and the number of the retransmission resources can be configured by gNB/eNB (such as BS 10 in FIG. 1) or preconfigured in the transmitting UE (such as UE 22 in FIG. 2).

In some embodiments of the present application, the distance or MCL between the transmitting UE and the receiving UE is defined as a plurality of levels based on at least one threshold. The threshold can be configured by gNB/eNB (such as BS 10 in FIG. 1) or preconfigured in the transmitting UE (such as UE 22 in FIG. 2).

In an embodiment of the present application, the distance or MCL between the transmitting UE and the receiving UE can be divided into two levels (i.e., a highest level and a lowest level). No or a minimum retransmission resource is reserved for the at least one packet in response to the distance or MCL with the highest level, and a maximum of retransmission resources is reserved for the at least one packet in response to the distance or MCL with the lowest level. The minimum retransmission resource may be 1 or another number less than the maximum retransmission resources.

In another embodiment of the present application, the distance or MCL between the transmitting UE and the receiving UE can be divided into more than two levels, such as three levels (i.e., a highest level, a middle level and a lowest level). No retransmission resource is reserved in response to the distance or MCL with the highest level, one retransmission resource is reserved in response to the distance or MCL with the middle level, and two retransmission resources are reserved in response to the distance or MCL with the lowest level. It should be understand that, the number of the retransmission resources, i.e., one and two are provided as examples, which can be changed according to the actual needs.

For yet another example, in some embodiments of the present application, the transmitting UE may determine whether one or more retransmission resources are to be reserved based on the Channel Busy Ratio (CBR) of a transmission resource pool. The transmission resource pool can be measured by the transmitting UE in the resource pool. The better the CBR is, the less the retransmission resources are to be reserved. The mapping relationship between the CBR and the number of the retransmission resources can be configured by gNB/eNB (such as BS 10 in FIG. 1) or preconfigured in the transmitting UE (such as UE 22 in FIG. 2).

For example, in some embodiments of the present application, the CBR is defined as a plurality of levels based on at least one threshold. The threshold can be configured by gNB/eNB (such as BS 10 in FIG. 1) or preconfigured in the transmitting UE (such as UE 22 in FIG. 2).

In an embodiment of the present application, the CBR is divided into two levels (i.e., a highest level and a lowest level). No or a minimum retransmission resource is reserved for the at least one packet in response to the CBR with the highest level, and a maximum of retransmission resources is reserved for the at least one packet in response to the CBR with the lowest level. The minimum retransmission resource may be 1 or another number less than the maximum retransmission resources.

In another embodiment of the present application, the CBR is divided into more than two levels, such as three levels (i.e., a highest level, a middle level and a lowest level). No retransmission resource is reserved in response to the CBR with the highest level, one retransmission resource is reserved in response to the CBR with the middle level, and two retransmission resources are reserved in response to the CBR with the lowest level. It should be understood that, the number of the retransmission resources, i.e., one and two are provided as examples, which can be changed according to the actual needs.

For yet another example, in some embodiments of the present application, the transmitting UE may determine whether one or more retransmission resources are to be reserved is based on a mapping between levels of the Channel Busy Ratio (CBR) of a transmission resource pool and levels of the service requirement of the transmitting UE. The mapping between the levels of the CBR and the levels of the service requirement is configured by gNB/eNB (such as BS 10 in FIG. 1) or preconfigured in the transmitting UE (such as UE 22 in FIG. 2).

For example, in some embodiments of the present application, the CBR is defined as a plurality of levels based on at least one threshold, and the service requirement is defined as a plurality of levels based on at least one threshold. The threshold can be configured by gNB/eNB (such as BS 10 in FIG. 1) or preconfigured in the transmitting UE (such as UE 22 in FIG. 2). For example, the higher the CBR level is and the higher the service requirement level is, the more the retransmission resources are to be reserved, the higher the CBR level is and the lower the service requirement level is, the less the retransmission resources are to be reserved. The service requirement may include, for example, priority, reliability, Path Quality Indication (PQI), latency requirement, data rate requirement, and minimum transmission range requirement.

For another example, for different CBR levels, services that are allowed to reserve retransmission resources can be different in accordance with the level of priorities. In an embodiment of the present application, the CBR is divided into three levels, (i.e., a highest level, a middle level and a lowest level). The priority is divided into three levels, (i.e., a highest level, a middle level and a lowest level). For the CBR with the highest level, only service with the highest priority can be reserved retransmission resource(s), that is, one or more retransmission resources can be reserved for the at least one packet in response to the service with the highest priority. For the CBR with the middle level, service with the highest and middle priorities can be reserved retransmission resource(s), that is, one or more retransmission resources can be reserved for the at least one packet in response to the services with the highest and middle priorities. For the CBR with the lowest level, all the services can be reserved retransmission resource(s), that is, one or more retransmission resources can be reserved for the at least one packet in response to the services with the highest, middle and lowest priorities.

In step 305, the one or more retransmission resources can be reserved for at least one of the packets in response to that the one or more retransmission resources are determined to be reserved.

For example, in the case that the transmitting UE determines to reserve the retransmission resources, the transmitting UE may select the one or more retransmission resources by sensing available resources in a transmission resource pool. The transmitting UE may randomly select the one or more retransmission resources in a transmission resource pool in another embodiment of the present application. In yet another embodiment of the present application, the transmitting UE may request a base station (gNB or eNB) to reserve the one or more retransmission resources, for example, by radio resource control (RRC) signaling, MAC layer signaling, or physical layer signaling.

For the reserved retransmission resources, they may not be used due to the associated packet has been correctly transmitted. They can be reused for other transmissions to avoid resource waste and improve resource efficiency.

Figure 4:
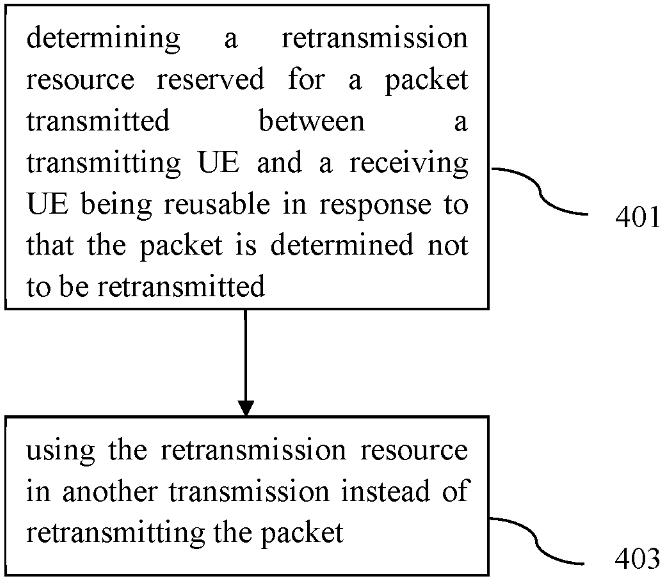
FIG. 4 is a flow diagram illustrating a method for sidelink resource allocation in accordance with some embodiments of the present application.

FIG. 4 is a flow diagram illustrating a method for sidelink resource allocation in accordance with some embodiments of the present application. The method may be implemented by a UE, for example, any UE in the wireless communication system 100 shown in FIG. 1 and the wireless communication system 200 shown in FIG. 2.

As shown in step 401, a retransmission resource reserved for a packet transmitted between a transmitting UE and a receiving UE is determined being reusable in response to that the packet is determined not to be retransmitted. For example, both the transmitting UE and receiving UE know whether the previous transmission is correct or not. The receiving UE can know that the retransmission resource needs not to be reused for retransmitting once it correctly receives the previous transmission. Then, the receiving UE can determine the retransmission resource is reusable for other transmissions. For the transmitting UE, it can determine whether the reserved retransmission resource is reusable for other transmissions based on HARQ feedback from the receiving UE. The transmitting UE can release the reserved retransmission resources so that it can be reusable for other transmissions.

As shown in step 403, the retransmission resource can be reused in another transmission instead of retransmitting the packet.

In an embodiment of the present application, the receiving UE may correctly receive the previous transmission and determine the reserved retransmission resource for the previous transmission is reusable. The receiving UE may want to reuse the reserved retransmission resource before the retransmission resource is released by the transmitting UE. Accordingly, the receiving UE may direct occupy the reserved retransmission resource by sending an indication to the transmitting UE. For example, the receiving UE would like to use the retransmission resources, and it may transmit an indication (such as 1 bit) to the transmitting UE, indicating the receiving UE will occupy the retransmission resource. The indication can be transmitted to the transmitting UE together with the HARQ ACK associated with the corresponding previous transmission.

In the other hand, in the case that the receiving UE does not use the retransmission source, it may also transmit an indication (such as 1 bit) to the transmitting UE, indicating the receiving UE will not occupy the retransmission resource. The indication can be transmitted to the transmitting UE together with the HARQ ACK associated with the corresponding previous transmission.

In some embodiments of the present application, the transmitting UE can reuse the retransmission resource after determining the retransmission resource is reusable, for example after receiving a HARQ ACK from the receiving UE and an indication indicating the receiving UE will not reuse the retransmission resources.

In some embodiments of the present application, the reserved retransmission resources can be released to be reusable by various manners.

In an embodiment of the present application, the reserved retransmission resources can be released by the receiving UE. For example, the receiving UE may transmit a HARQ ACK to the transmitting UE, and release the retransmission resource by sending an indication that the retransmission resource is released, for example to other UEs sharing the same resource pool with the transmitting UE and receiving UE. Other UEs who receive the indication can reuse the released retransmission resource. For example, the receiving UE may broadcast the message of releasing the retransmission resource via sidelink control information (SCI) signaling.

In another embodiment of the present application, the reserved retransmission resources can be released by the transmitting UE. For example, after receiving a HARQ ACK feedback from the receiving UE, the transmitting UE may release the reserved retransmitting resource by sending an indication indicating that the retransmission resource is released, for example to other UEs sharing the same resource pool with the transmitting UE and receiving UE. Then other UEs who receive the indication can use the released retransmission resource. For example, the transmitting UE may broadcast the message of releasing the retransmission resource via SCI signaling.

In some embodiment of the present application, other UEs sharing the same resource pool with the transmitting UE and receiving UE can monitor the HARQ feedback transmitted by the receiving UE to the transmitting UE. In the case that the HARQ feedback is ACK, the other UEs can determine the reserved UE is reusable and then reuse the reserved the retransmission resource.

Figure 5:
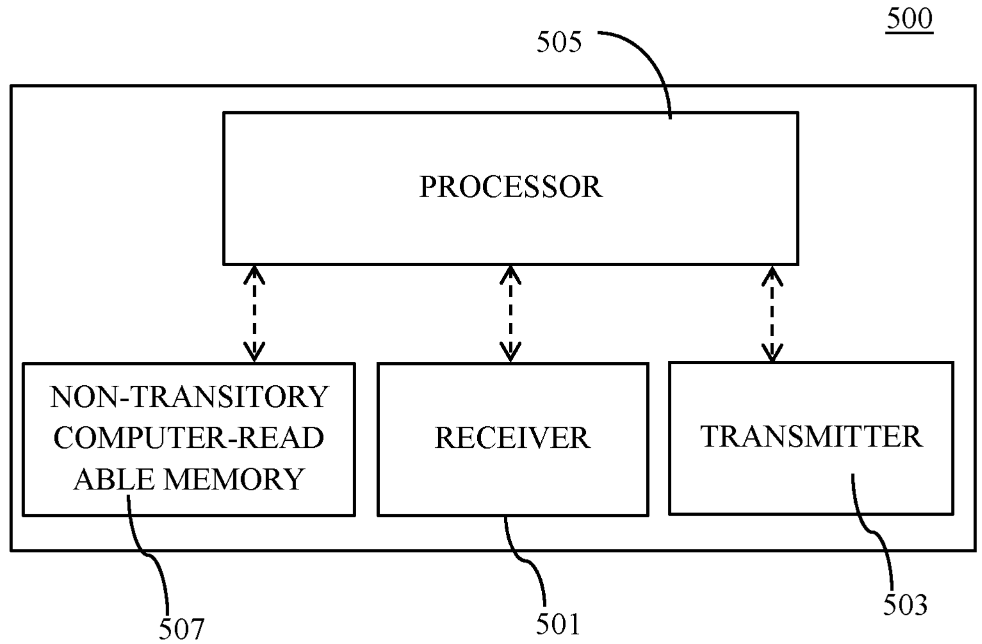
FIG. 5 illustrates an apparatus for sidelink resource allocation in accordance with some embodiments of the present application.

FIG. 5 illustrates an apparatus for sidelink resource allocation in accordance with some embodiments of the present application.

As shown in FIG. 5, the apparatus 500 may include a receiver 501, a transmitter 503, a processer 505, and a non-transitory computer-readable medium 507. The non-transitory computer-readable medium 507 has computer executable instructions stored therein. The processer 505 is configured to be coupled to the non-transitory computer readable medium 507, the receiver 501, and the transmitter 503. It is contemplated that the apparatus 500 may include more computer-readable mediums, receiver, transmitter and processors in some other embodiments of the present application according to practical requirements. In some embodiments, the apparatus 500 may be a UE. UE may include, for example but is not limited to, a computing device, a wearable device, a mobile device, an IoT device, a vehicle having at least a transceiver, etc. In some embodiments of the present application, the receiver 501 and the transmitter 503 are integrated into a single device, such as a transceiver. In certain embodiments, the apparatus 500 may further include an input device, a memory, and/or other components.

In some embodiments of the present application, the non-transitory computer-readable medium 507 may have stored thereon computer-executable instructions to cause a processor to implement the method depicted in FIG. 3 or FIG. 4.

In some embodiments of the present application, the apparatus may be a vehicle. Persons skilled in the art should understand that as the technology develops and advances, the terminologies described in the present application may change, and should not affect or limit the principle and spirit of the present application.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method performed by a transmitting user equipment (UE), the method comprising:

determining a plurality of initial transmission resources, wherein each of the plurality of initial transmission resources is associated with a packet for transmission on a sidelink channel between the transmitting UE and a receiving UE;

determining whether one or more retransmission resources are reserved for at least one packet associated with the plurality of initial transmission resources; and reserving the one or more retransmission resources for the at least one packet in response to that the one or more retransmission resources being determined as reserved and in response to a channel busy ratio of a transmission resource pool, the channel busy ratio being defined as a plurality of levels based on a threshold, wherein a quantity of the one or more retransmission resources for the at least one packet is:

a minimum quantity of retransmission resources in response to the channel busy ratio being of a highest level of the plurality of levels; and a maximum quantity of retransmission resources in response to the channel busy ratio being of a lowest level of the plurality of levels.

2. The method of claim 1, further comprising receiving hybrid automatic repeat request (HARQ) feedback from the receiving UE associated with a first packet of one or more packets and, in response to that the HARQ feedback from the receiving UE is a HARQ acknowledgement (ACK), determining to reserve no retransmission resource or a minimum retransmission resource for a second packet of the one or more packets.

3. The method of claim 2, wherein reserving the one or more retransmission resources is further in response to a plurality of HARQ negative acknowledgements (NACKs) including a HARQ NACK associated with the first packet in a time period.

4. The method of claim 2, further comprising:

determining not to retransmit the second packet; and determining that a first reserved retransmission resource of the one or more retransmission resources is reusable in response to determining that the second packet is not retransmitted.

5. The method of claim 4, further comprising using the first reserved retransmission resource of the one or more retransmission resources in another transmission.

6. The method of claim 2, wherein the threshold comprises a third threshold and wherein reserving the one or more retransmission resources for the second packet is further in response to at least one of:

a channel status between the transmitting UE and the receiving UE defined as a first plurality of levels based on a first threshold; and a distance or maximum coupling loss between the transmitting UE and the receiving UE, the distance or maximum coupling loss being defined as a second plurality of levels based on a second threshold.

7. The method of claim 2, wherein the one or more retransmission resources are unreserved prior to receiving the HARQ feedback from the receiving UE.

8. The method of claim 3, wherein the second packet is subsequent to the first packet.

9. The method of claim 3, further comprising, in response to the HARQ feedback from the receiving UE being the HARQ NACK, reserving one or more retransmission resources for each packet being transmitted in a second time period after receiving the HARQ feedback.

10. The method of claim 3, further comprising:

releasing the one or more retransmission resources in response to one or more HARQ ACKS received from the receiving UE.

11. The method of claim 1, wherein reserving the one or more retransmission resources comprises one of the following:

selecting the one or more retransmission resources by sensing available resources in a transmission resource pool;

randomly selecting the one or more retransmission resources in a transmission resource pool; and requesting a base station to reserve the one or more retransmission resources.

12. A transmitting user equipment (UE) for wireless communications, comprising:

at least one memory; and at least one processor coupled with the at least one memory and configured to cause the UE to:

determine a plurality of initial transmission resources, wherein each of the plurality of initial transmission resources is associated with a packet for transmission on a sidelink channel between the transmitting UE and a receiving UE;

determine whether one or more retransmission resources are reserved for at least one packet associated with the plurality of initial transmission resources; and reserve the one or more retransmission resources for the at least one packet in response to the one or more retransmission resources being determined as reserved and in response to a channel busy ratio of a transmission resource pool, the channel busy ratio being defined as a plurality of levels based on a threshold, wherein a quantity of the one or more retransmission resources for the at least one packet is:

a minimum quantity of retransmission resources in response to the channel busy ratio being of a highest level of the plurality of levels; and a maximum quantity of retransmission resources in response to the channel busy ratio being of a lowest level of the plurality of levels.

13. The UE of claim 12, wherein the at least one processor is configured to cause the UE to receive hybrid automatic repeat request (HARQ) feedback from the receiving UE associated with a first packet of one or more packets and, in response to that the HARQ feedback from the receiving UE is a HARQ acknowledgement (ACK), determine to reserve no retransmission resource or a minimum retransmission resource for a second packet of the one or more packets.

14. The UE of claim 13, wherein reserving the one or more retransmission resources is further in response to a plurality of HARQ negative acknowledgement (NACKs) including a HARQ NACK associated with the first packet in a time period.

15. The UE of claim 14, wherein the second packet is subsequent to the first packet.

16. The UE of claim 14, wherein the at least one processor is configured to cause the UE to, in response to the HARQ feedback from the receiving UE being the HARQ NACK, reserve one or more retransmission resources for each packet being transmitted in a second time period after receiving the HARQ feedback.

17. The UE of claim 14, wherein the at least one processor is configured to cause the UE to:

release the one or more retransmission resources in response to one or more HARQACKs received from the receiving UE.

18. The UE of claim 12, wherein reserving the one or more retransmission resources comprises one of the following:

selecting the one or more retransmission resources by sensing available resources in a transmission resource pool;

randomly selecting the one or more retransmission resources in a transmission resource pool; and requesting a base station to reserve the one or more retransmission resources.

19. The UE of claim 13, wherein the at least one processor is configured to cause the UE to:

determine not to retransmit the second packet; and determine that a first reserved retransmission resource of the one or more retransmission resources is reusable in response to determining that the second packet is not retransmitted.

20. The UE of claim 19, wherein the at least one processor is configured to cause the UE to use the first reserved retransmission resource of the one or more retransmission resources in another transmission.

* * * * *